United States Patent
Dong

(10) Patent No.: US 12,469,974 B2
(45) Date of Patent: Nov. 11, 2025

(54) ELECTRONIC DEVICE

(71) Applicant: HONOR DEVICE CO., LTD., Guangdong (CN)

(72) Inventor: Xiaoyong Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 52 days.

(21) Appl. No.: 18/279,257

(22) PCT Filed: Apr. 26, 2022

(86) PCT No.: PCT/CN2022/089381
§ 371 (c)(1),
(2) Date: Aug. 29, 2023

(87) PCT Pub. No.: WO2023/005300
PCT Pub. Date: Feb. 2, 2023

(65) Prior Publication Data
US 2024/0186701 A1 Jun. 6, 2024

(30) Foreign Application Priority Data
Jul. 30, 2021 (CN) .......................... 202110873589.6

(51) Int. Cl.
*H01Q 7/00* (2006.01)
*H04B 5/20* (2024.01)
(Continued)

(52) U.S. Cl.
CPC ................ *H01Q 7/00* (2013.01); *H04B 5/20* (2024.01); *H04B 5/26* (2024.01); *H04B 5/43* (2024.01)

(58) Field of Classification Search
CPC ... H01Q 7/00; H04B 5/20; H04B 5/26; H04B 5/43
See application file for complete search history.

(56) References Cited

U.S. PATENT DOCUMENTS

| | | | |
|---|---|---|---|
| 2015/0055009 A1 | 2/2015 | Choi et al. | |
| 2017/0256856 A1* | 9/2017 | Lilja | H01Q 7/06 |

(Continued)

FOREIGN PATENT DOCUMENTS

| | | |
|---|---|---|
| CN | 105742786 A | 7/2016 |
| CN | 106210194 A | 12/2016 |

(Continued)

OTHER PUBLICATIONS

CN105742786A_Machine_Translation (Year: 2016).*

(Continued)

*Primary Examiner* — Hai V Tran
*Assistant Examiner* — Michael M Bouizza

(57) ABSTRACT

This application provides an electronic device. The electronic device includes a rear cover, a camera bracket, and an NFC antenna. The camera bracket is disposed on the rear cover and includes a first surface and a second surface that are oppositely disposed. The first surface of the camera bracket faces an outer side of the electronic device. A first light hole is disposed in the camera bracket, and the first light hole is configured to be opposite to a first camera flash or a first camera. The NFC antenna is laid on the first surface of the camera bracket. A first orthographic projection of the NFC antenna on the first surface of the camera bracket falls into the first surface of the camera bracket and does not overlap the first light hole, so that the NFC antenna avoids the first light hole.

11 Claims, 9 Drawing Sheets

(51) Int. Cl.
*H04B 5/26* (2024.01)
*H04B 5/43* (2024.01)

(56) References Cited

U.S. PATENT DOCUMENTS

2020/0249731 A1* 8/2020 Chun .................... G06F 1/1686
2020/0272198 A1* 8/2020 Ju ......................... H01Q 1/243

FOREIGN PATENT DOCUMENTS

| | | |
|---|---|---|
| CN | 106898883 A | 6/2017 |
| CN | 109037905 A | 12/2018 |
| CN | 210780900 U | 6/2020 |
| CN | 211556118 U | 9/2020 |
| CN | 112003967 A | 11/2020 |
| CN | 112117524 A | 12/2020 |
| CN | 112653826 A | 4/2021 |
| JP | 2015136040 A | 7/2015 |
| WO | 2018008961 A1 | 1/2018 |

OTHER PUBLICATIONS

CN112003967A_Machine_Translation (Year: 2020).*
Zhu Jiaqi, "Wireless Near Field Electromagnetic Coupling Antenna and its Applications on Mobile Terminals", CNKI Full-text Database of Outstanding Chinese Master's Theses: Information Technology Series, Mar. 15, 2021, total 180 pages.
T. Bauernfeind, K. Preis, W. Renhart, O. Biró and M. Gebhart, "Finite Element Simulation of Impedance Measurement Effects of NFC Antennas," in IEEE Transactions on Magnetics, vol. 51, No. 3, pp. 1-4, Mar. 2015, Art No. 7400804, doi: 10.1109/TMAG.2014.2354982.

* cited by examiner

A-A

ELECTRONIC DEVICE

CROSS-REFERENCE TO RELATED APPLICATIONS

This application is a national stage of International Application No. PCT/CN2022/089381, filed on Apr. 26, 2022, which claims priority to Chinese Patent Application No. 202110873589.6, filed on Jul. 30, 2021. The disclosures of both of the aforementioned applications are hereby incorporated by reference in their entireties.

TECHNICAL FIELD

This application relates to the field of NFC antenna technologies, and in particular, to an electronic device.

BACKGROUND

A current development trend of an electronic device is that a camera module is increasingly large, and a quantity of cameras is increasingly large. Based on this, an area that is of a rear cover and that is occupied by a camera bracket is increasingly large.

A near field communication (near field communication, NFC) antenna has two forms. In one form, the NFC antenna is multiplexed with another antenna. In the other form, the NFC antenna is a standalone NFC antenna. For the standalone NFC antenna, there are two relatively mainstream arrangement solutions at present. In one solution, the NFC antenna surrounds a camera bracket by one round. In the other solution, the NFC antenna and a camera bracket are arranged side by side on a rear cover of an electronic device. However, as an area that is of a rear cover and that is occupied by a camera bracket increases, in the first arrangement solution, the NFC antenna cannot be traced. In the second solution, an arrangement region of the NFC antenna is reduced. Radiation performance of the NFC antenna cannot be ensured in either of the two arrangement solutions.

SUMMARY

To resolve a problem that radiation performance of an NFC antenna cannot be ensured by using an existing NFC antenna arrangement solution, this application provides an electronic device, so that an NFC antenna can still have good radiation performance in a scenario in which a quantity of cameras is increasingly large and a camera bracket is increasingly large.

This application provides an electronic device. The electronic device includes a rear cover, a camera bracket, and an NFC antenna. The camera bracket is disposed on the rear cover and includes a first surface and a second surface that are oppositely disposed. The first surface of the camera bracket faces an outer side of the electronic device. A first light hole is disposed in the camera bracket, and the first light hole is configured to be opposite to a first camera flash or a first camera. The NFC antenna is laid on the first surface of the camera bracket. A first orthographic projection of the NFC antenna on the first surface of the camera bracket falls into the first surface of the camera bracket and does not overlap the first light hole, so that the NFC antenna avoids the first light hole.

In this embodiment, the first orthographic projection of the NFC antenna on the first surface of the camera bracket falls into the first surface, that is, the NFC antenna is laid in the first surface. As a quantity of cameras increases, the camera bracket disposed on the rear cover also becomes larger, and an area of the first surface also correspondingly increases. Compared with a case in which an area of the first surface is relatively small, at a same relative laying position in the first surface, an area of a region surrounded by the NFC antenna in this embodiment also increases as the area of the first surface increases. It should be noted that radiation performance of the NFC antenna is positively correlated with the area of the region surrounded by the NFC antenna. Therefore, when the area of the region surrounded by the NFC antenna increases, the radiation performance of the NFC antenna is improved.

In addition, because the camera bracket is disposed on the rear cover of the electronic device, the camera bracket is not in a stacking path from a display screen of the electronic device to the rear cover, and a thickness of the camera bracket is usually not considered as a factor for thinning the electronic device. Therefore, the NFC antenna is laid in the first surface, and the NFC antenna is not in the stacking path from the display screen of the electronic device to the rear cover, so that the NFC antenna does not become a bottleneck for thinning the electronic device.

Optionally, there are a plurality of first light holes: and the plurality of first light holes are arrayed in a ring on the camera bracket. It should be understood that when the camera bracket has a plurality of first light holes, a size of the camera bracket is relatively large, so that the area of the first surface is relatively large. Based on this, the area of the region surrounded by the NFC antenna laid in the first surface can be ensured, so that the radiation performance of the NFC antenna can be ensured.

In a possible design solution, ferrite and a metal trace traced along an edge of the ferrite are disposed on the NFC antenna. A region of the metal trace on the first orthographic projection is a trace projection region, and the trace projection region is a ring. The first light hole is located inside the ring corresponding to the trace projection region.

In this design solution, if the trace projection region is a ring, the metal trace is also a ring. Because all the first light holes are located inside the ring corresponding to the trace projection region, the metal trace is laid at a position between the first light holes and an edge of the camera bracket, and the first light holes are surrounded by the metal trace. It can be learned that the metal trace is a ring located between the first light holes and the edge of the camera bracket. As the quantity of cameras increases, a quantity of first light holes increases, and the camera bracket also becomes larger, and therefore the area of the first surface correspondingly increases. It should be understood that when the area of the first surface increases, an area of any ring located between the first light holes and the edge of the camera bracket also accordingly increases. Based on this, a trace area of the metal trace (a ring located between the first light holes and the edge of the camera bracket) is increased, so that the radiation performance of the NFC antenna is improved.

Optionally, a smallest distance between an edge line of the first light hole and an edge line of the camera bracket is greater than a first threshold. The first threshold is at least a trace width of the metal trace. In this way, it can be ensured that space between the first light hole and the edge of the camera bracket is sufficient to lay the NFC antenna, to ensure the radiation performance of the NFC antenna.

In another possible design solution, ferrite and a metal trace traced along an edge of the ferrite are disposed on the NFC antenna. A region of the metal trace on the first orthographic projection is a trace projection region, and the trace projection region is a ring. The first light hole is located outside the ring corresponding to the trace projection region.

In this design solution, if the trace projection region is a ring, the metal trace is also a ring. Because all the first light holes are located outside the ring corresponding to the trace projection region, the metal trace is laid at a position inside an array path of the first light holes. It can be learned that the metal trace is a ring located inside the array path of the first light holes. As the quantity of cameras increases, a quantity of first light holes increases, and the camera bracket also becomes larger, and therefore the area of the first surface correspondingly increases. It should be understood that when the area of the first surface increases, an area of any ring located inside the array path of the first light holes also accordingly increases. Based on this, a trace area of the metal trace (a ring located inside the array path of the first light holes) is increased, so that the radiation performance of the NFC antenna is improved.

Optionally, a smallest distance between an edge line of the first light hole and an edge line of the camera bracket is less than a second threshold. The second threshold is at least a trace width of the metal trace. In this case, space between the first light hole and the edge of the camera bracket is relatively small and is insufficient to lay the NFC antenna. It should be understood that when an overall structure of the camera bracket is relatively large and the space between the first light hole and the edge of the camera bracket is relatively small, a region inside the array path of the first light holes is certainly relatively large. In this case, the solution in which the metal trace is laid at the position inside the array path of the first light holes may be implemented in this scenario, to ensure the radiation performance of the NFC antenna.

Optionally, two adjacent first light holes on the array path are respectively a first adjacent hole and a second adjacent hole. The NFC antenna has an extension region extending in a first direction, and the first direction deviates from a geometric center of the camera bracket and is oriented between the first adjacent hole and the second adjacent hole. In this embodiment, the extension region exists, so that the NFC antenna harvests an area of a region surrounded by the metal trace through tracing in the extension region. Therefore, the radiation performance of the NFC antenna is improved.

As an optional embodiment, a distance between the first adjacent hole and the second adjacent hole in an array direction is greater than a third threshold, and the third threshold is at least three times the trace width of the metal trace. A part that is of the metal trace and that is located in the extension region includes a first trace and a second trace. Both the first trace and the second trace extend in a second direction and pass through a position between the first adjacent hole and the second adjacent hole. The first trace and the second trace are spaced apart in a third direction. The third direction is the array direction of the first adjacent hole and the second adjacent hole, and the second direction is perpendicular to the third direction.

It should be noted that, the radiation performance of the NFC antenna can be improved to a relatively large extent by using the extension region, and the existence of the extension region is meaningful only when a trace area of the metal trace in the extension region is sufficiently large.

In this embodiment, when the distance between the first adjacent hole and the second adjacent hole in the array direction is greater than the third threshold, it indicates that the distance between the first adjacent hole and the second adjacent hole is relatively large. Only in this case, can a relatively large distance be maintained between the first trace and the second trace that pass through the position between the first adjacent hole and the second adjacent hole, to obtain a sufficiently large trace area. In addition, both the first trace and the second trace are traced in the second direction, and therefore can respectively maintain a same interval with the first adjacent hole and the second adjacent hole. On one hand, beauty can be increased. On the other hand, a problem that processing is difficult due to an excessively large interval on one side and an excessively small interval on the other side is avoided. In addition, a distance is maintained between the first trace and the second trace in the third direction. The trace area of the metal trace is determined by the region surrounded by the metal trace. Therefore, when there is a distance between the first trace and the second trace in the third direction, a trace area can be harvested by using the extension region, and the existence of the extension region is meaningful.

As another optional embodiment, a distance between the first adjacent hole and the second adjacent hole in an array direction is less than a fourth threshold, and the fourth threshold is at least three times the trace width of the metal trace. A part that is of the metal trace and that is located in the extension region includes a first trace and a second trace. The first trace and the second trace gradually converge in a second direction, and the second direction is perpendicular to the array direction of the first adjacent hole and the second adjacent hole.

It should be noted that, when the distance between the first adjacent hole and the second adjacent hole in the array direction is less than the fourth threshold, it indicates that the distance between the first adjacent hole and the second adjacent hole is not large. In this case, if both the first trace and the second trace extend in the second direction, a distance between the first trace and the second trace is also relatively small. Therefore, tracing difficulty is relatively high, and a requirement for a processing technology is extremely high. In addition, the distance between the first trace and the second trace is relatively small, and therefore a trace area benefit that can be obtained is relatively small. Harvesting a relatively small trace area in a relatively difficult processing technology is undoubtedly not worth the candle. Based on this, in this embodiment, the first trace and the second trace are in a state of gradually converging in the second direction, to avoid a case in which tracing is difficult because the distance between the first adjacent hole and the second adjacent hole in the array direction is not large. In addition, compared with a solution in which no extension region exists, in this embodiment, the trace area of the metal trace in the extension region can be harvested, so that the radiation performance of the NFC antenna can be improved.

In still another possible design solution, ferrite and a metal trace traced along an edge of the ferrite are disposed on the NFC antenna. A region of the metal trace on the first orthographic projection is a trace projection region, and the trace projection region is a ring. A part of the plurality of first light holes are located outside the ring corresponding to the trace projection region: and a remaining part of the plurality of first light holes are located inside the ring corresponding to the trace projection region.

Because the first light hole may be configured to mount a camera, a camera flash, or a sensor, different components may be mounted in different first light holes, and the first light holes may be inconsistent in size. Therefore, there is a possible case in which space between some first light holes and the edge of the camera bracket is relatively small and space between some first light holes and the edge of the camera bracket is relatively large. The first light holes having relatively small space with the edge of the camera bracket are located inside the ring corresponding to the trace projection region, that is, are surrounded by the metal trace. The first light holes having relatively large space with the edge of the camera bracket are located outside the ring corresponding to the trace projection region, that is, are located outside the metal trace. It can be learned that, in this embodiment, a position at which tracing can be performed between the first light hole and the edge of the camera bracket is fully used for tracing, to maximize the trace area, thereby improving the radiation performance of the NFC antenna.

For example, when a smallest distance between an edge line of the first light hole and an edge line of the camera bracket is less than a first threshold, the first light hole is located outside the ring corresponding to the trace projection region. The first threshold is at least a trace width of the metal trace. When a smallest distance between an edge line of the first light hole and an edge line of the camera bracket is greater than the first threshold, the first light hole is located inside the ring corresponding to the trace projection region.

In this example, when the smallest distance between the edge line of the first light hole and the edge line of the camera bracket is less than the first threshold, it may be considered that space between the first light hole and the edge of the camera bracket is relatively small, and the metal trace cannot be traced from this place: or when the smallest distance between the edge line of the first light hole and the edge line of the camera bracket is greater than the first threshold, it may be considered that space between the first light hole and the edge of the camera bracket is relatively large, and the metal trace can be traced from this place, so that the metal trace surrounds the first through hole to obtain an area benefit of this part.

Optionally, an avoidance hole is disposed in the NFC, a region of the avoidance hole on the first orthographic projection is an avoidance region, and the avoidance region is located inside the ring corresponding to the trace projection region. A second light hole is further disposed in the camera bracket, the second light hole overlaps the avoidance region, and the second light hole is configured to be opposite to a second camera flash, a second sensor, or a second camera.

In this embodiment, the avoidance region overlaps the second light hole, that is, the second light hole is disposed in a region that is of the camera bracket and that faces the avoidance hole. It should be understood that the avoidance region is located inside the ring corresponding to the trace projection region. It indicates that the avoidance hole is disposed in a region inside the metal trace. The disposition of the avoidance hole does not affect the trace area of the metal trace, and therefore causes no impact on the radiation performance of the NFC antenna. On a premise of ensuring the radiation performance of the NFC antenna, in this embodiment, one more light hole is added on a basis of not increasing a size of the camera bracket. Therefore, mounting of one more camera can be supported, thereby helping meet a trend that a quantity of cameras increases.

Optionally, the electronic device further includes a decorative lens. A back adhesive region is disposed at an edge of the first surface of the camera bracket, and the decorative lens is fastened to the first surface of the camera bracket through connection to the back adhesive region. The NFC antenna is disposed between the decorative lens and the first surface of the camera bracket, and the first orthographic projection does not overlap the back adhesive region. In this embodiment, the decorative lens can protect and beautify the camera. The first orthographic projection does not overlap the back adhesive region, that is, the NFC antenna needs to avoid the back adhesive region during laying, to avoid a case in which warping is caused by the NFC antenna when the decorative lens is mounted and consequently good bonding and sealing cannot be implemented.

DESCRIPTION OF EMBODIMENTS

In embodiments of this application, the terms "first", "second", and "third" are used for descriptive purposes only, and cannot be construed as indicating or implying relative importance or implicitly indicating a quantity of indicated technical features. Therefore, a feature defined by "first", "second", or "third" may explicitly or implicitly include one or more such features.

In the embodiments of this application, the term "and/or" is only used to describe an association relationship between associated objects, and indicates that three relationships may exist. For example, A and/or B may indicate the following three cases: Only A exists, both A and B exist, and only B exists. In addition, the character "/" in this specification generally indicates an "or" relationship between associated objects.

In the embodiments of this application, "ring" is a shape obtained after an outer edge of a predetermined shape is extended inward by a predetermined distance to form an inner edge. Based on this, the ring has an outer edge line and an inner edge line, an inner side of the ring is a region inside the inner edge line of the ring, and an outer side of the ring is a region outside the outer edge line of the ring. Details are not described subsequently again. It should be understood that, in the embodiments of this application, the ring may be a circular ring, or may be a non-circular ring, for example, a square ring or a polygonal ring.

With development of technologies, an electronic device such as a mobile phone, a tablet computer, or a notebook computer generally has an NFC function, to implement a function such as mobile payment. Radiation performance of an NFC antenna is critical to the NFC function.

It should be noted that the NFC antenna includes ferrite and a metal trace. The metal trace is used for electromagnetic wave radiation, and the ferrite is used to reduce a risk of an eddy current caused by mutual interference between the NFC antenna and another electronic component (for example, each component on a main board) of the electronic device. The ferrite includes two opposite surfaces, and the metal trace is laid on one surface of the ferrite along an edge of the ferrite. The radiation performance of the NFC antenna is mainly affected by an area (subsequently referred to as a trace area) of a region (subsequently referred to as a trace region, where when the metal trace is a plurality of coils, a region surrounded by an outermost coil is usually considered as a trace region) surrounded by the metal trace, and is basically not affected by whether ferrite exists in the trace region. In addition, a larger trace area indicates better radiation performance of the NFC antenna. Whether ferrite exists in the trace region affects an anti-interference effect of the NFC antenna.

Figure 1:
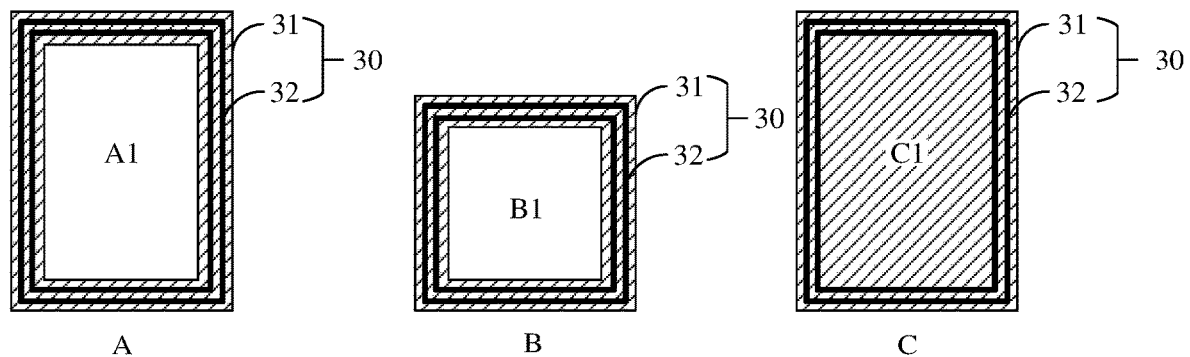
FIG. 1 is a schematic diagram of structures of three types of NFC antennas according to an embodiment of this application.

As shown in FIG. 1, in FIG. 1A, an NFC antenna 30 includes ferrite 31 and a metal trace 32 traced along an edge of the ferrite 31. A trace region of the metal trace 32 is a region A1. Different from FIG. 1A, in FIG. 1B, a trace region of a metal trace 32 is a region B1. Different from FIG. 1A, in FIG. 1C, a trace region of a metal trace 32 is a region C1. It can be learned, through comparison between FIG. 1A and FIG. 1B, that a trace area of the trace region A1 is greater than a trace area of the trace region B1, and therefore radiation performance of the NFC antenna shown in FIG. 1A is better. It can be learned, through comparison between FIG. 1B and FIG. 1C, that no ferrite exists in the trace region A1, and ferrite exists in the trace region C1. However, because the trace area of the trace region A1 is the same as a trace area of the trace region C1, the radiation performance of the NFC antenna shown in FIG. 1A is approximately the same as radiation performance of an NFC antenna shown in FIG. 1C.

Based on this, how to ensure a trace area of an NFC antenna and how to obtain a largest trace area benefit in limited space are critical to ensuring radiation performance of the NFC antenna.

Figure 2:
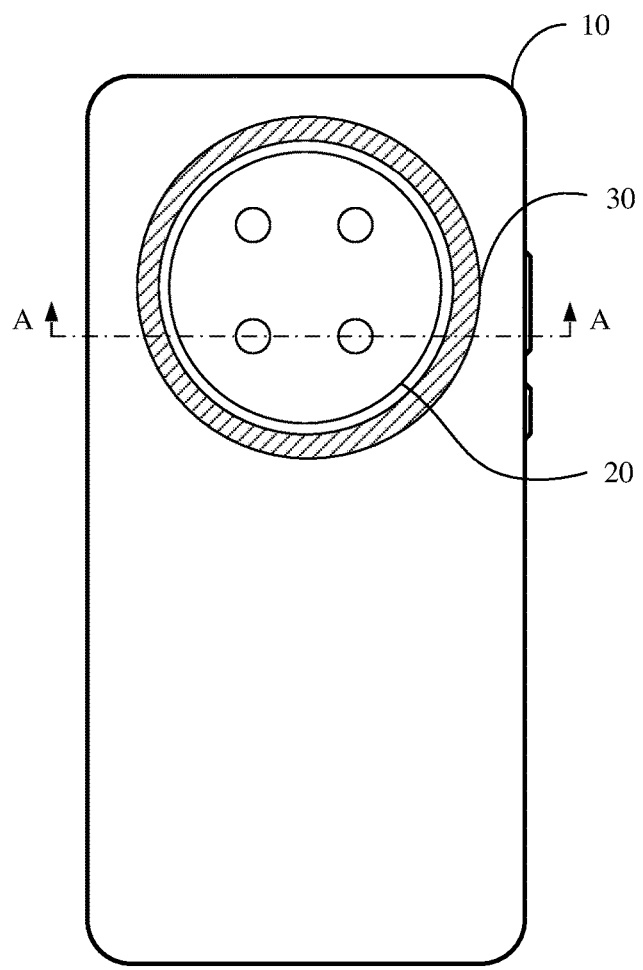
FIG. 2 is a schematic diagram of an arrangement position of an NFC antenna on an electronic device in a possible design solution.

Referring to FIG. 2, FIG. 2 is a schematic diagram of an arrangement position of an NFC antenna on an electronic device in a possible design solution. The electronic device includes a rear cover 10, a camera bracket 20, and an NFC antenna 30. Both the camera bracket 20 and the NFC antenna 30 are disposed on the rear cover 10. The camera bracket 20 is configured to mount a camera of the electronic device. In some embodiments, if the electronic device includes a camera flash or a sensor, the camera bracket 20 is further configured to mount the camera flash or the sensor. It should be understood that "mounting" herein means that the camera bracket 20 needs to separately have a specific matching relationship with the camera, the camera flash, or the sensor during disposition, and does not mean that the camera, the camera flash, or the sensor necessarily separately has a direct connection relationship with the camera bracket 20. For example, a light hole in the camera bracket is in a facing relationship with the camera. Certainly, in another embodiment, there may be a connection relationship. This is not specifically limited in this embodiment of this application.

On one hand, the camera bracket 20 can decorate the camera, the camera flash, or the sensor. On the other hand, the camera bracket 20 can protect the camera, the camera flash, or the sensor from being damaged. As shown in FIG. 2, the NFC antenna 30 is distributed in a circumferential direction of the camera bracket 20 and surrounds the camera bracket 20.

In this design solution, when an area that is of the rear cover 10 and that is occupied by the camera bracket 20 increases, a trace area of the NFC antenna 30 also increases. However, because inner space of the electronic device is limited, when a trace area of the NFC antenna 30 increases, a metal trace of the NFC antenna 30 is blocked by another component (such as a battery) inside the electronic device during laying, and therefore cannot be traced. In other words, the design solution shown in FIG. 2 cannot support laying of an NFC antenna 30 with a large trace area. In a scenario in which an area of a camera bracket 20 is excessively large, another manner needs to be sought to ensure a trace area of an NFC antenna 30, to ensure radiation performance of the NFC antenna 30.

Figure 3:
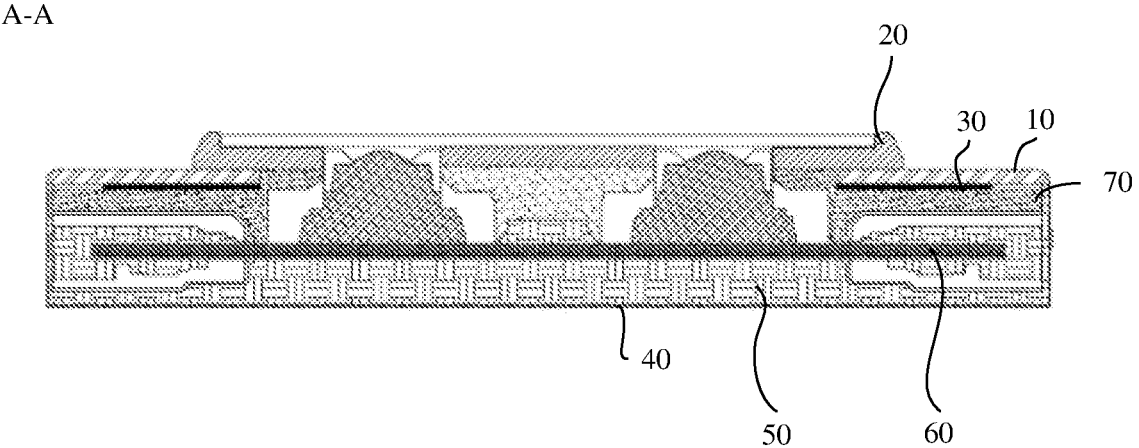
FIG. 3 is a cross-sectional view obtained by sectioning FIG. 2 along an A-A sectional line.

Referring to FIG. 3, FIG. 3 is a cross-sectional view obtained by sectioning the electronic device shown in FIG. 2 along an A-A sectional line. The electronic device includes the rear cover 10, a middle frame 50, and a display screen 40. The display screen 40 and the rear cover are respectively disposed on two opposite sides of the middle frame 50 and form a cavity. A main board 60, a main board bracket 70 for supporting the main board 60, and the NFC antenna 30 are stacked in the cavity. It can be learned that the NFC antenna 30 is a component of the electronic device on a stacking path in a thickness direction. With popularity of an ultra-thin electronic device, a thickness of the NFC antenna 30 is also one of bottlenecks for thinning the entire device.

Figure 4:
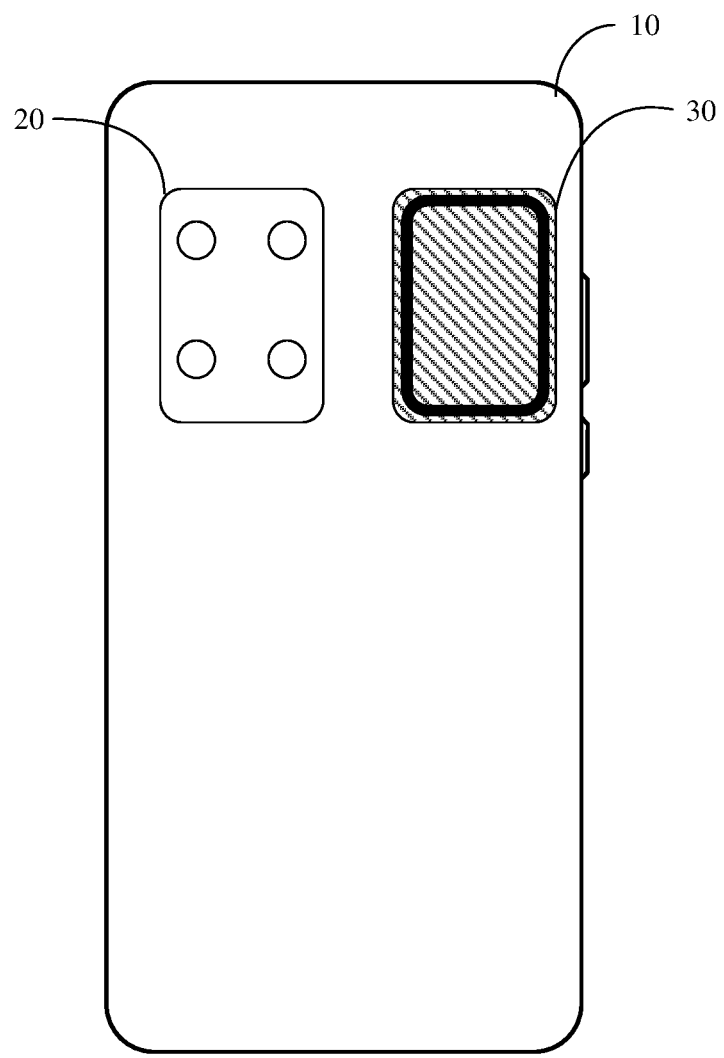
FIG. 4 is a schematic diagram of an arrangement position of an NFC antenna on an electronic device in another possible design solution.

Referring to FIG. 4, FIG. 4 is a schematic diagram of an arrangement position of an NFC antenna in another possible design solution. Different from the solutions shown in FIG. 2 and FIG. 3, a camera bracket 20 and an NFC antenna 30 are distributed side by side on a rear cover 10 of an electronic device, and the NFC antenna 30 is located on a side of the camera bracket 20.

In this design solution, when an area that is of the rear cover 10 and that is occupied by the camera bracket 20 increases, area space that can be used by the NFC antenna 30 is squeezed. Based on this, a trace area of the NFC antenna 30 decreases, and therefore radiation performance of the NFC antenna 30 cannot be ensured. In addition, in the solution shown in FIG. 4, the NFC antenna 30 is also a component of the electronic device on a stacking path in a thickness direction, that is, a thickness of the NFC antenna 30 is still a bottleneck for thinning the entire device.

It can be learned that in both the foregoing two embodiments, tracing of the NFC antenna 30 is affected by the area occupied by the camera bracket 20. However, a current development trend of an electronic device is that a camera module is increasingly large, and a quantity of cameras is increasingly large. Based on this, an area that is of a rear cover 10 and that is occupied by a camera bracket 20 is also increasingly large. It is clear that the arrangement manners of the NFC antennas 30 shown in FIG. 1 and FIG. 4 cannot meet a development requirement of the electronic device.

In addition, in the foregoing two embodiments, the NFC antenna 30 is a component of the electronic device on the stacking path in the thickness direction.

To resolve a problem that an NFC antenna is a bottleneck for thinning an electronic device in the conventional technology and a tracing manner of the NFC antenna cannot ensure radiation performance of the NFC antenna as an area occupied by a camera bracket increases in the conventional technology, this application provides an improved electronic device.

The electronic device can ensure a trace area of an NFC antenna in a scenario in which a camera bracket is relatively large, so that radiation performance of the NFC antenna is ensured, and the NFC antenna is no longer a bottleneck for thinning the electronic device. It should be understood that, the electronic device in the embodiments of this application may be a device having an NFC antenna and a camera, such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)\virtual reality (virtual reality, VR) device. A specific form of the electronic device is not specially limited in the embodiments of this application.

The following describes implementations of the embodiments of this application in detail with reference to the accompanying drawings.

Figure 5:
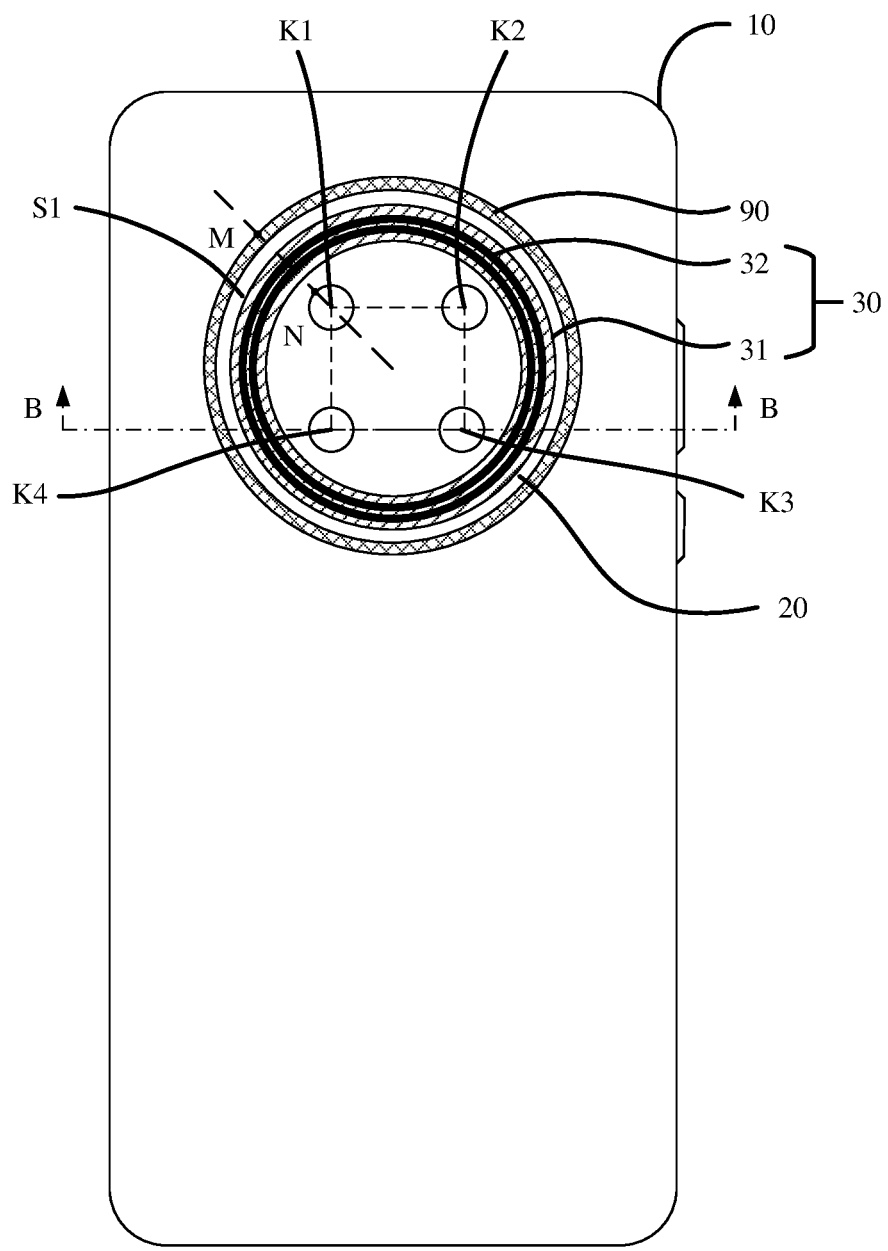
FIG. 5 is a schematic diagram of a structure of an electronic device according to some embodiments of this application.
Figure 6:
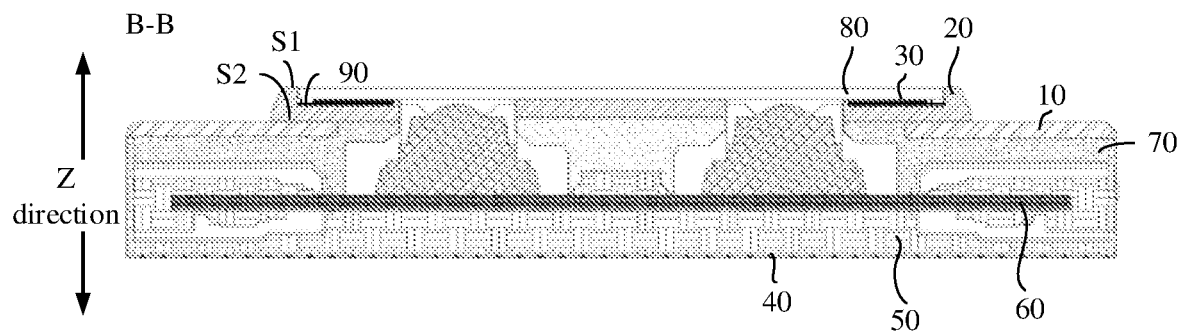
FIG. 6 is a cross-sectional view obtained by sectioning the electronic device shown in FIG. 5 along a B-B sectional line.

Referring to FIG. 5 and FIG. 6, FIG. 5 is a schematic diagram of a structure of an electronic device according to some embodiments of this application: and FIG. 6 is a cross-sectional view obtained through sectioning along a B-B sectional line in FIG. 5. The electronic device is a mobile phone, and includes a middle frame 50 (not shown in FIG. 5), a display screen 40 (not shown in FIG. 5), and a rear cover 10. The middle frame 50 is configured to fasten and support functional components in the electronic device, and the middle frame 50 is usually made of a metal material such as stainless steel or aluminum alloy. The display screen 40 and the rear cover 10 are respectively disposed on two opposite sides of the middle frame 50, and the display screen 40, the middle frame 50, and the rear cover 10 are disposed in a stacking manner. In some embodiments, functional components such as a front-facing camera module, an earpiece, and a strobe light are disposed on the display screen 40. In some embodiments, functional components such as a main board 60, a battery, and a speaker are disposed between the rear cover 10 and the middle frame 50. In addition, a mounting hole is disposed in the rear cover 10, and the mounting hole is configured to mount a camera assembly of the electronic device.

As shown in FIG. 5, the camera assembly includes a camera bracket 20, and a camera, a camera flash, or a sensor (not shown in FIG. 5) mounted in the camera bracket 20. The sensor may be a component that requires light to participate in detection, such as a time of flight (time of flight, TOF) sensor, an ambient light sensor, or an infrared temperature-measuring sensor. The camera bracket 20 is also referred to as a camera decorative member, and may be circular in shape. It should be understood that, although FIG. 5 shows a case in which the camera bracket 20 is circular, the camera bracket 20 may be alternatively in another regular or approximately-regular shape such as an ellipse, a rectangle, or a rhombus. This is not specifically limited in this embodiment of this application. The camera bracket 20 is embedded into the mounting hole disposed in the rear cover 10, to be mounted on the rear cover 10. The camera bracket 20 includes a first surface S1 and a second surface S2 (not shown in FIG. 5) that are oppositely disposed, and the first surface S1 of the mounted camera bracket 20 is a surface that faces an outer side of the electronic device.

Four first light holes are disposed in the camera bracket 20: a light hole K1, a light hole K2, a light hole K3, and a light hole K4. The light hole K1 may be opposite to a camera, and is configured to mount the camera. In this case, light can pass through the light hole K1 and enter the camera, to implement shooting. Alternatively, the light hole K1 may be opposite to a camera flash, and is configured to mount the camera flash. In this case, light emitted by the camera flash can pass through the light hole K1, to implement irradiation. Alternatively, the light hole K1 may be opposite to a sensor, and is configured to mount the sensor. In this case, the sensor may monitor an external environment by using the light hole K1. It should be understood that "mounting" herein means that the light hole K1 needs to separately have a facing relationship with the camera, the camera flash, or the sensor during disposition, and does not mean that the camera, the camera flash, or the sensor separately has a direct connection relationship with the camera bracket 20. Certainly, in another embodiment, there may be a direct connection relationship. This is not specifically limited in this embodiment of this application. For subsequent related content, refer to this definition. Details are not described below again. The other first light holes can be implemented in the same manner. Details are not described herein. It should be understood that generally, the electronic device has only one camera flash. Based on this, the electronic device has only one first light hole configured to mount a camera flash. It should be noted that, although FIG. 5 shows a case in which there are four first light holes and the four first light holes are arrayed in a square, this example should not be understood as a special limitation on this application. In another embodiment, a quantity of first light holes may be another quantity, for example, 3, 4, or 5, or even more. It should be understood that as a quantity of cameras of the electronic device increases, a quantity of required first light holes also accordingly increases. A larger quantity of first light holes indicates a larger corresponding size of the camera bracket 20 and also indicates a larger occupied area of the rear cover. Generally, when the camera bracket 20 has more than three first light holes, an area that is of the rear cover and that is occupied by the camera bracket 20 is relatively large.

In addition, the light hole K1, the light hole K2, the light hole K3, and the light hole K4 are arrayed along a square ring. Specifically, that the light hole K1, the light hole K2, the light hole K3, and the light hole K4 are arrayed along a square ring means that circles (geometric centers) of the light hole K1, the light hole K2, the light hole K3, and the light hole K4 are sequentially head-to-tail connected to form a square array path (shown by a square dashed-line in the figure). It should be understood that the geometric center is a most central position of an object having specific symmetry, for example, a circle center, a sphere center, or an intersection point of two diagonals of a parallelogram. Based on this, in another embodiment, if the first light hole is in another shape, such as a rhombus, a square, or a rectangle, in this case, an intersection point of two diagonals is a geometric center of the first light hole. In addition, it should be noted that, in another embodiment, the first light holes may be alternatively arrayed on an array path of another ring, for example, an elliptical ring, a rectangular ring, a rhombus ring, or a polygonal ring. This is not specifically limited in this embodiment of this application.

As shown in FIG. 5, to implement an NFC function, the electronic device further includes an NFC antenna 30. The NFC antenna 30 is laid on the first surface S1 of the camera bracket 20, and an orthographic projection (a first orthographic projection) of the NFC antenna 30 on the first surface S1 in a thickness direction (a Z direction shown by an arrow in FIG. 6) of the electronic device falls into the first surface S1, that is, the NFC antenna 30 is laid in the first surface S1. Specifically, laying of the NFC antenna 30 may be implemented by digging a groove on the first surface S1 of the camera bracket 20. A protrusion height of the camera bracket 20 from the rear cover 10 is relatively large, and a common protrusion height is 0.85~1.0 mm, or is higher, for example, 2~3 mm. Therefore, it can be learned that a thickness of the camera bracket 20 is sufficiently large, and strength of the camera bracket 20 is also sufficient to support digging a groove on the surface of the camera bracket 20 to lay the NFC antenna 30.

It should be noted that because the camera bracket 20 protrudes from the rear cover 10 of the electronic device, the camera bracket 20 is not on a stacking path of the electronic device from the display screen 40 to the rear cover 10, and the thickness of the camera bracket 20 is usually not considered as a factor for thinning the electronic device. Therefore, laying the NFC antenna 30 in the first surface S1 causes an increase in a protrusion thickness of the camera assembly from the rear cover 10, rather than an increase in a thickness of the electronic device. Compared with the solutions shown in FIG. 2 and FIG. 4, the NFC antenna 30 is not on the stacking path from the display screen to the rear cover 10, and therefore the NFC antenna does not become a bottleneck for thinning the electronic device, and the thickness of the electronic device can be further reduced. In addition, the NFC antenna 30 is laid on the first surface S1 of the camera bracket 20 through groove digging, so that the NFC antenna 30 may be alternatively flush with the first surface S1 of the camera bracket 20, causing on increase in the protrusion thickness of the camera assembly from the rear cover 10.

It should be further noted that in this embodiment of this application, only a part that is of the NFC antenna 30 and that is located inside the camera bracket 20 is shown and described. It should be understood that the NFC antenna 30 further has a part located outside the camera bracket 20, and a feed point is disposed in the part. The NFC antenna 30 is coupled to a radio frequency module on the main board 60 (shown in FIG. 6 but not shown in FIG. 5) by using the feed point. The radio frequency module receives an electromagnetic wave through the NFC antenna 30, performs frequency modulation and filtering processing on an electromagnetic wave signal, and sends a processed signal to a processor. The radio frequency module may further perform frequency modulation and amplification on a signal sent by the processor, and convert the signal into an electromagnetic wave through the NFC antenna 30 for radiation.

In addition, in this embodiment, because the NFC antenna 30 is moved from the stacking path in the thickness direction of the electronic device to the camera bracket 20, a distance between the NFC antenna 30 and the main board 60 becomes longer. Therefore, a connection between the NFC antenna 30 and the main board 60 has some differences compared with a current connection solution of the NFC antenna. Specifically, as shown in FIG. 6, the NFC antenna 30 and the main board 60 may be connected by abutting a spring sheet mounted on the main board 60 against the feed point of the NFC antenna 30 on the camera bracket 20. Compared with a common spring sheet, the spring sheet used in this embodiment is higher. In addition, a longer flexible printed circuit (flexible printed circuit, FPC) may be alternatively used. In this case, an end at which the feed point of the NFC antenna 30 is located may be fastened to a main board bracket 70. In this case, a common spring sheet is used to abut against the main board bracket 70. The FPC may also be replaced with the NFC connection manner herein or replaced with a board to board (board to board, B2B) connector.

As shown in FIG. 5, to prevent laying of the NFC antenna 30 from affecting normal working of a component corresponding to the first light hole, the orthographic projection (the first orthographic projection) of the NFC antenna 30 on the first surface S1 overlaps none of the light hole K1, the light hole K2, the light hole K3, and the light hole K4, so that the NFC antenna avoids the light hole K1, the light hole K2, the light hole K3, and the light hole K4. In this way, the NFC antenna 30 does not block the first light hole.

To enable the first orthographic projection to overlap none of the light hole K1, the light hole K2, the light hole K3, and the light hole K4, in the electronic device shown in FIG. 5, the NFC antenna 30 includes ring ferrite 31 and a metal trace 32 traced along an edge of the ferrite 31. The metal trace 32 is also a ring, and a region of the metal trace 32 on the first orthographic projection is a trace projection region. Because the metal trace 32 is a ring, the trace projection region is also a ring. The light hole K1, the light hole K2, the light hole K3, and the light hole K4 are all located inside the ring corresponding to the trace projection region. In other words, the metal trace 32 surrounds the light hole K1, the light hole K2, the light hole K3, and the light hole K4.

In this embodiment, the metal trace 32 surrounds the light hole K1, the light hole K2, the light hole K3, and the light hole K4. In addition, it can be seen from FIG. 5 that no ferrite is laid in a region inside the metal trace 32, that is, none of the light hole K1, the light hole K2, the light hole K3, and the light hole K4 overlaps the ferrite 31, either. Therefore, the first orthographic projection does not overlap the first light hole. In this way, the NFC antenna 30 can avoid the first light hole, to avoid affecting normal working of the component corresponding to the first light hole.

It should be understood that, although FIG. 5 shows that the ferrite 31 is a hollow ring structure, in another embodiment, the ferrite 31 may be alternatively disposed as a structure that avoids only the light hole K1, the light hole K2, the light hole K3, and the light hole K4, that is, the ferrite 31 is laid on an inner side (referred to as the region inside the metal trace 32) of the first surface S1 except positions of the first light holes. In this way, a risk of an eddy current caused by mutual interference between the NFC antenna 30 and another electronic component of the electronic device can be further reduced. This is not specifically limited in this embodiment of this application. It should be noted that a ferrite region through which the metal trace 32 passes has a better ant-interference effect than a ferrite region (the region inside the metal trace 32) through which the metal trace 32 does not pass. In view of the fact that radiation performance of the NFC antenna 30 is determined by a trace area of the metal trace 32, whether ferrite is laid in the region inside the metal trace 32 has relatively small impact on an improvement effect of the radiation performance of the NFC antenna 30, and in consideration of costs and processing difficulty factors, the solution shown in FIG. 5 is usually selected to lay the ferrite 31.

To protect and beautify the camera, in some embodiments, as shown in FIG. 6, the electronic device further includes a decorative lens 80. The decorative lens 80 is fastened to the first surface S1 through bonding to a back adhesive region 90 on an edge of the first surface S1. The NFC antenna 30 is disposed between the decorative lens 80 and the first surface S1, and does not overlap the back adhesive region 90. That is, the NFC antenna 30 needs to avoid the back adhesive region 90 during laying, to avoid a case in which warping is caused by the NFC antenna 30 when the decorative lens 80 is mounted and consequently good bonding and sealing cannot be implemented.

It should be noted that the solution shown in FIG. 5 is usually applied to a scenario in which an area that is of the rear cover and that is occupied by the camera bracket 20 is relatively large, and space between the first light hole and an edge of the camera bracket 20 is relatively large. In this way, it can be ensured that an area between the first light hole and the camera bracket 20 is sufficiently large to lay the NFC antenna 30, to meet the radiation performance of the NFC antenna 30. In some embodiments, when a smallest distance between an edge line of the first light hole and an edge line of the camera bracket 20 is greater than a first threshold, it may be considered that the space between the first light hole and the edge of the camera bracket 20 is relatively large.

The smallest distance between the edge line of the first light hole and the edge line of the camera bracket 20 is a distance between two closest positions on the edge line of the first light hole and the edge line of the camera bracket 20. The light hole K1 is used as an example for description below, and the other first light holes may be implemented through reference. Referring to FIG. 5, when the camera bracket 20 is circular and the light hole K1 is circular, a straight line is formed from a circle center of the camera bracket 20 to a circle center of the light hole K1. The straight line respectively intersects with the edge line of the camera bracket 20 and an edge line of the light hole K1 at an M point and an N point, and a distance between the M point and the N point is the foregoing smallest distance. In another embodiment, when the camera bracket 20 is rectangular and the light hole K1 is circular, the foregoing smallest distance is a smallest distance in distances between a circle center of the light hole K1 and sides of the camera bracket 20.

Figure 7:
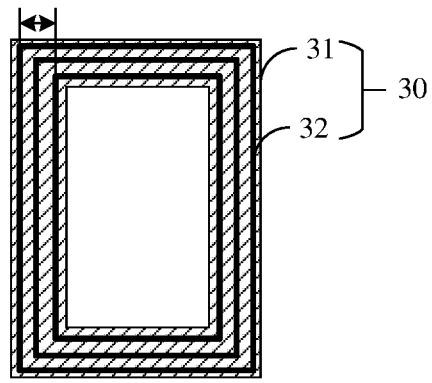
FIG. 7 is a schematic diagram of a trace width of a metal trace according to an embodiment of this application.

The first threshold is at least a trace width of the metal trace 32. The trace width of the metal trace 32 is a width occupied by all coils (one round by which the metal trace 32 is wound on the ferrite 31 is one coil, and FIG. 5 has two coils) wound on the ferrite 31, and is not a width of a single metal trace 32. For example, as shown in FIG. 7, a metal trace 32 wounded on ferrite 31 has three coils, and a trace width of the metal trace 32 is marked by using a dual-arrow line. Considering that the metal trace 32 needs to separately maintain distances from the back adhesive region 90 and the first through hole to avoid the back adhesive region 90 and the first through hole, preferably, the first threshold is greater than the trace width of the metal trace 32. For example, in an existing processing technology, the trace width of the metal trace 32 is usually 2.5 mm, a width of the back adhesive region 90 is usually 1 mm, a distance between the back adhesive region 90 and an outer edge line of the metal trace 32 is usually 0.5 mm, and a distance between an inner edge line of the metal trace 32 and the first light hole is usually 1 mm. Therefore, the first threshold may be twice the trace width of the metal trace 32.

It should be understood that, although FIG. 5 shows a case in which both the ferrite 31 and the metal trace 32 are circular rings, and the NFC antenna 30 also presents a circular ring as a whole, in another embodiment, the NFC antenna 30 may be in another shape. This is not specifically limited in this embodiment of this application. It should be understood that, for a beauty effect, a shape of the NFC antenna 30 may be designed in a differentiated manner based on factors such as a shape of the camera bracket 20, the positions of the first light holes, and a windowing size of the decorative lens 80 (shown in FIG. 6), to ensure normal structural protection, a laying effect of text such as type identification information and parameter information of the camera assembly, and the like, to maximally hide the NFC antenna 30 under a decorative pattern of a compact disk (compact disk, CD) of the decorative lens 80.

In the electronic device shown in FIG. 5, if the trace projection region is a ring, the metal trace 32 is also a ring. Because all the first light holes are located inside the ring corresponding to the trace projection region, the metal trace 32 is laid at a position between the first light holes and the edge of the camera bracket 20, and the first light holes are surrounded by the metal trace 32. It can be learned that the metal trace 32 is a ring located between the first light holes and the edge of the camera bracket 20. As a quantity of cameras increases, a quantity of first light holes increases, and the camera bracket 20 also becomes larger, and therefore an area of the first surface S1 correspondingly increases. It should be understood that when the area of the first surface S1 increases, an area of any ring located between the first light holes and the edge of the camera bracket 20 also accordingly increases. Based on this, the trace area of the metal trace 32 (a ring located between the first light holes and the edge of the camera bracket 20) is increased, so that the radiation performance of the NFC antenna 30 is improved.

Figure 8:
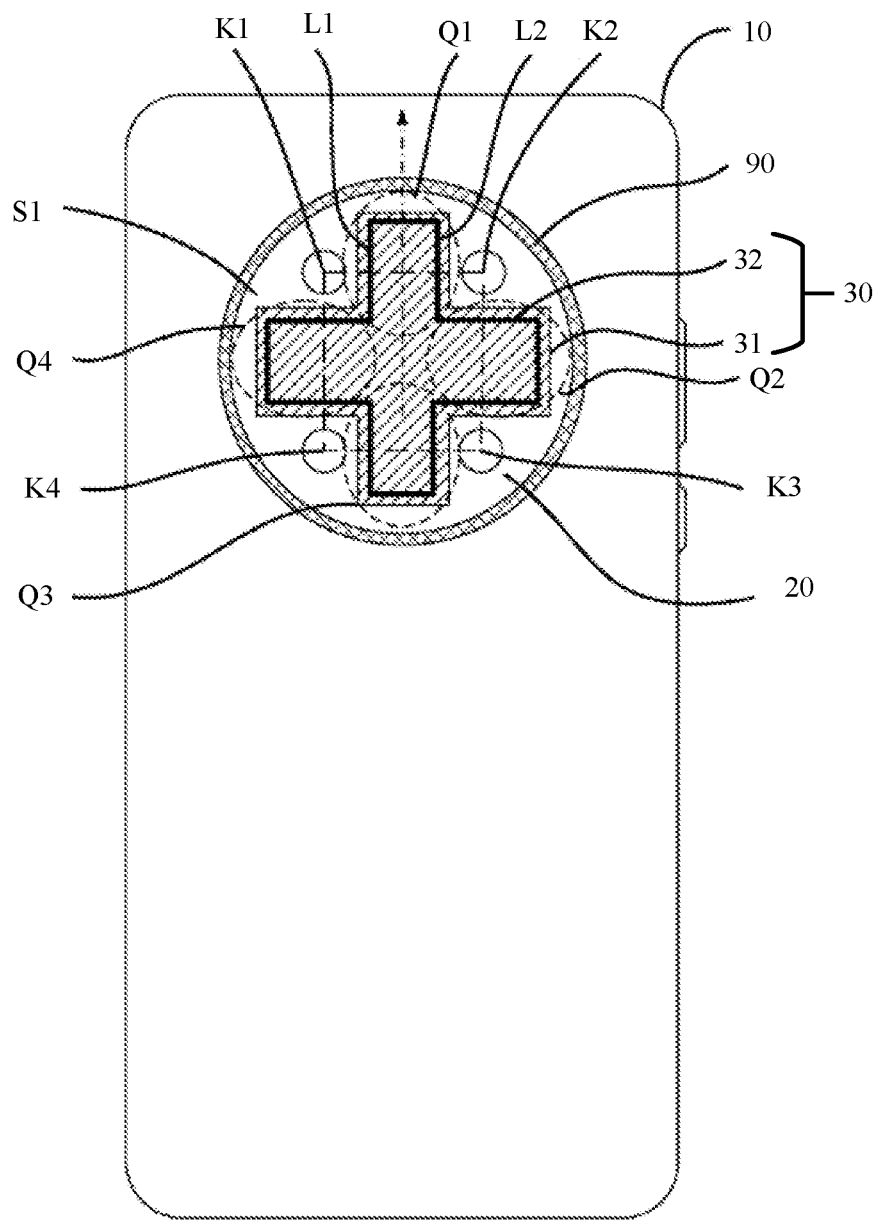
FIG. 8 is a schematic diagram of a structure of an electronic device according to some other embodiments of this application.

Referring to FIG. 8, FIG. 8 is a schematic diagram of a structure of an electronic device according to some other embodiments of this application. Different from the electronic device shown in FIG. 5, the electronic device is applied to a scenario in which am overall structure of a camera bracket 20 is relatively large and space between a first light hole and an edge of the camera bracket 20 is relatively small. For example, when a smallest distance between an edge line of the first light hole and an edge line of the camera bracket 20 is less than a second threshold, it may be considered that the space between the first light hole and the edge of the camera bracket 20 is relatively small. The second threshold is at least a trace width of a metal trace 32. For specific implementation of the smallest distance between the edge line of the first light hole and the edge line of the camera bracket 20, refer to the related content in FIG. 5. For specific implementation of the second threshold, refer to the implementation of the first threshold. Details are not described herein. It should be understood that the first threshold and the second threshold may be a same value, or may be different values. This is not specifically limited in this embodiment of this application. It is clear that in this case, the space between the first light hole and the edge of the camera bracket 20 is insufficient to implement the solution shown in FIG. 5.

It should be understood that when the overall structure of the camera bracket 20 is relatively large and the space between the first light hole and the edge of the camera bracket 20 is relatively small, a region inside an array path (that is a closed path formed by sequentially head-to-tail connecting geometric centers of a plurality of first light holes and shown by a square dashed-line in the figure) of the first light holes is usually relatively large. In this way, the region inside the array path of the first light holes has a sufficiently large area to lay an NFC antenna 30. Based on this, different from the electronic device shown in FIG. 5, in the electronic device shown in FIG. 8, a light hole K1, a light hole K2, a light hole K3, and a light hole K4 are located outside a ring corresponding to a trace projection region and do not overlap a first orthographic projection. In other words, in the solution shown in FIG. 8, the first light holes are located outside the metal trace 32, and the metal trace 32 is laid at a position inside the array path of the first light holes.

It should be understood that, because the metal trace 32 is traced along an edge of ferrite 31, a projection region of the ferrite 31 further exists outside the ring corresponding to the trace projection region. In this embodiment, the light hole K1, the light hole K2, the light hole K3, and the light hole K4 are located outside the ring corresponding to the trace projection region, and also do not overlap the first orthographic projection. Therefore, the first light hole in this embodiment is essentially not laid outside the metal trace 32, but laid outside the NFC antenna 30. It should be further understood that, in this embodiment, although FIG. 8 shows that the ferrite 31 is a solid structure, in another embodiment, the ferrite 31 may be alternatively disposed as a ring structure. For specific implementation, refer to related content in FIG. 5. Details are not described herein again.

In the electronic device shown in FIG. 8, if the trace projection region is a ring, the metal trace 32 is also a ring. Because all the first light holes are located outside the ring corresponding to the trace projection region, the metal trace 32 is laid at the position inside the array path of the first light holes. It can be learned that the metal trace 32 is a ring located inside the array path of the first light holes. As a quantity of cameras increases, a quantity of first light holes increases, and the camera bracket 20 also becomes larger, and therefore an area of a first surface S1 correspondingly increases. It should be understood that when the area of the first surface S1 increases, an area of any ring located inside the array path of the first light holes also accordingly increases. Based on this, a trace area of the metal trace 32 (a ring located inside the array path of the first light holes) is increased, so that radiation performance of the NFC antenna 30 is improved.

As shown in FIG. 8, to obtain a trace area benefit as large as possible to improve the radiation performance of the NFC antenna 30, the NFC antenna 30 has four extension regions: an extension region Q1, an extension region Q2, an extension region Q3, and an extension region Q4. The extension region Q1 is used as an example below to describe specific implementation of the extension region. The other extension regions may be implemented through reference.

The extension region Q1 extends in a second direction (shown by a dashed-line arrow in the figure), and passes through a position between the light hole K1 (a first adjacent hole) and the light hole K2 (a second adjacent hole) that are adjacent on the array path (shown by the dashed-line square in the figure). The second direction deviates from a circle center (a geometric center of the first surface S1) of the first surface S1, and is perpendicular to an array direction of the light hole K1 and the light hole K2. The array direction of the light hole K1 and the light hole K2 is a direction of a center line connecting a circle center (a geometric center) of the light hole K1 and a circle center (a geometric center) of the light hole K2. For ease of description, the array direction of the light hole K1 and the light hole K2 is referred to as a third direction below.

The ferrite and the metal trace traced along the edge of the ferrite are also laid in the extension region Q1. A part that is of the metal trace 32 and that is located in the extension region Q1 includes a first trace L1 and a second trace L2. Both the first trace L1 and the second trace L2 extend in the second direction and pass through the position between the light hole K1 and the light hole K2, and the first trace L1 and the second trace L2 are spaced apart in the third direction.

In this embodiment, the extension region Q1 exists, so that the NFC antenna 30 harvests a trace area obtained by tracing the metal trace 32 in the extension region Q1. Therefore, the radiation performance of the NFC antenna 30 is improved. In addition, both the first trace L1 and the second trace L2 are traced in the second direction, and therefore can respectively maintain a same interval with the light hole K1 and the light hole K2. On one hand, beauty can be increased. On the other hand, a problem that processing is difficult due to an excessively large interval on one side and an excessively small interval on the other side is avoided. In addition, a distance is maintained between the first trace L1 and the second trace L2 in the third direction. The trace area of the metal trace 32 is determined by a region surrounded by the metal trace 32. Therefore, when there is a distance between the first trace L1 and the second trace L2 in the third direction, a trace area can be harvested by using the extension region Q1, and the existence of the extension region Q1 is meaningful.

Certainly, in another embodiment, the extension region Q1 may alternatively deviate from the circle center of the first surface S1, and extend toward another position between the light hole K1 and the light hole K2. Correspondingly, the first trace L1 and the second trace L2 also extend toward the another position between the light hole K1 and the light hole K2. It should be understood that, compared with the solution of extending in the second direction, in the solution in which the extension region Q1 extends toward the another position (for example, in a direction deviating toward the light hole K1), respective distances between the first trace L1 and the second trace L2 and the light hole K1 and the light hole K2 are inconsistent. On one hand, beauty is not sufficient. On the other hand, there is a problem that processing is difficult due to an excessively large interval on one side and an excessively small interval on the other side.

In addition, the extension region Q1 may alternatively not pass through a position between the light hole K1 and the light hole K2. Correspondingly, the first trace L1 and the second trace L2 also do not pass through a position between the light hole K1 and the light hole K2. It should be understood that a most critical factor that affects the radiation performance of the NFC antenna 30 is the trace area of the metal trace 32, and a larger trace area of the metal trace 32 indicates better radiation performance of the NFC antenna 30. Therefore, compared with the solution in which the extension region Q1 does not pass through a position between the light hole K1 and the light hole K2, in the solution shown in FIG. 8, the extension region Q1 passes through the position between the light hole K1 and the light hole K2. In this way, an area of the extension region Q1 is sufficiently large. The area of the extension region Q1 is larger. Because the metal trace 32 is traced around the edge of the ferrite 31, when an area of the ferrite in the extension region Q1 is larger, the trace area of the metal trace 32 is larger, and the radiation performance of the NFC antenna 30 is better.

It should be noted that, the radiation performance of the NFC antenna 30 can be improved to a relatively large extent by using the extension region Q1, and the existence of the extension region Q1 is meaningful only when a trace area of the metal trace 32 in the extension region Q1 is sufficiently large. To enable the metal trace 32 to obtain a sufficiently large trace area through tracing in the extension region Q1, the solution shown in FIG. 8 is usually applied to a scenario in which a distance between the light hole K1 and the light hole K2 is relatively large. Only in this way, can a relatively large distance be maintained between the first trace L1 and the second trace L2, to obtain a sufficiently large trace area.

In some embodiments, a distance between the light hole K1 and the light hole K2 in the array direction is greater than a third threshold, and the third threshold is at least three times the trace width of the metal trace 32. It is considered that the distance between the light hole K1 and the light hole K2 is relatively large. The distance between the light hole K1 and the light hole K2 in the array direction is a distance between the circle center of the light hole K1 and the circle center of the light hole K2. For a specific definition of the trace width of the metal trace 32, refer to the solution shown in FIG. 5. Details are not described herein again. In this scenario, because the first trace L1 and the second trace L2 already occupy trace widths of two metal traces 32, a trace width of at least one metal trace 32 still remains between the first trace L1 and the second trace L2 without consideration of distances for avoiding the light hole K1 and the light hole K2. Therefore, when the third threshold is at least three times the trace width of the metal trace 32, the distance between the light hole K1 and the light hole K2 is sufficiently large, so that a sufficiently large area benefit can be obtained by using the extension region Q1 in the solution shown in FIG. 8.

In a specific implementation process, considering that the extension region Q1 needs to separately maintain distances from the light hole K1 and the light hole K2 for avoidance, and when the distance between the first trace L1 and the second trace L2 is relatively small, on one hand, a problem that tracing is difficult exists: and on the other hand, a problem that an area benefit is relatively low and NFC performance is improved to a relatively small extent exists, the third threshold may be greater than three times the trace width of the metal trace 32. For example, in an existing processing technology, the trace width of the metal trace 32 is usually 2.5 mm. Therefore, both a trace width of the first trace L1 and a trace width of the second trace L2 are 2.5 mm. The distance between the first trace L1 and the second trace L2 is 5 mm, a distance between the light hole K1 and an edge line (an edge line close to the first trace L1) of the extension region Q1 is 1 mm, and a distance between the light hole K2 and an edge line (an edge line close to the second trace L2) of the extension region Q1 is 1 mm. Therefore, the third threshold may be four times the trace width of the metal trace 32.

Figure 9:
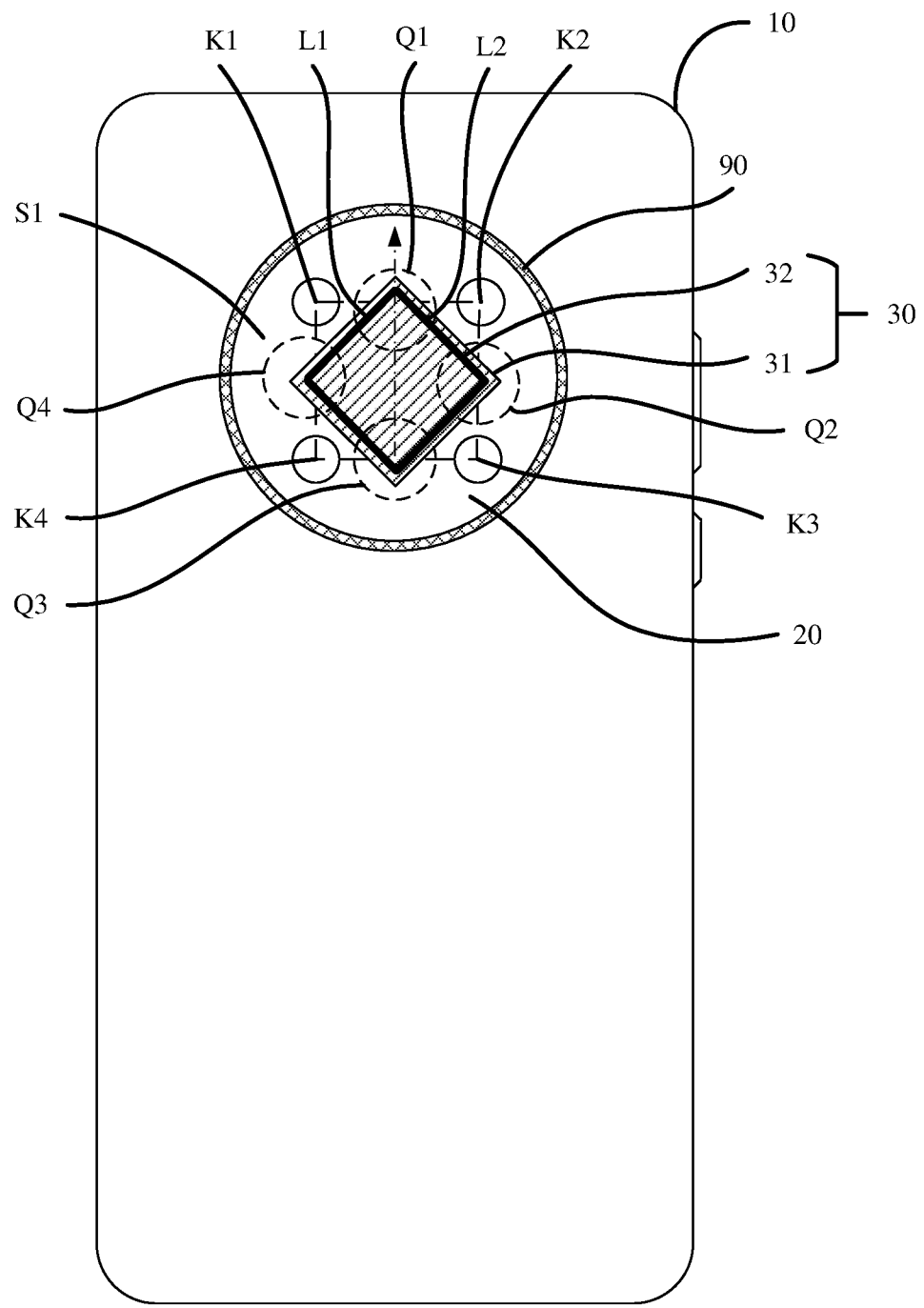
FIG. 9 is a schematic diagram of a structure of an electronic device according to some other embodiments of this application.

Referring to FIG. 9, FIG. 9 is a schematic diagram of a structure of an electronic device according to some other embodiments of this application. Different from the electronic device shown in FIG. 8, in the electronic device, a distance between a light hole K1 and a light hole K2 in an array direction is not large. For example, when the distance between the light hole K1 and the light hole K2 in the array direction is less than a fourth threshold, and the fourth threshold is at least three times a trace width of a metal trace 32, it may be considered that the distance between the light hole K1 and the light hole K2 in the array direction is not large. For specific implementation of the fourth threshold, refer to the implementation of the third threshold. It should be understood that the fourth threshold and the third threshold may be a same value, or may be different values. This is not specifically limited in this embodiment of this application. In this case, if the solution shown in FIG. 8 is used, respective distances between an extension region Q1 and the light hole K1 and the light hole K2 are extremely small, and a distance between a first trace L1 and a second trace L2 is also extremely small. Therefore, tracing difficulty is relatively high, and a requirement for a processing technology is extremely high. In addition, the distance between the first trace L1 and the second trace L2 is relatively small, and therefore a trace area benefit that can be obtained is relatively small. Harvesting a relatively small trace area in a relatively difficult processing technology is undoubtedly not worth the candle. Based on this, different from the electronic device shown in FIG. 8, in the electronic device shown in FIG. 9 (where the extension region Q1 is also used as an example for description), the extension region Q1 extends in a second direction, and passes through a position between the light hole K1 and the light hole K2, but the first trace L1 and the second trace L2 in the extension region Q1 gradually converge in the second direction.

Specifically, that the first trace L1 and the second trace L2 gradually converge in the second direction means that an interval between two corresponding points on the first trace L1 and the second trace L1 is gradually reduced in the second direction. The two corresponding points on the first trace L1 and the second trace L1 are two points at which a straight line extending in a third direction (perpendicular to the second direction) respectively intersects the first trace L1 and the second trace L1.

In this solution, if the first trace L1 and the second trace L2 are in a state of gradually converging in the second direction, when passing through the position between the light hole K1 and the light hole K2, the first trace L1 and the second trace L2 respectively have relatively large distances from the light hole K1 and the light hole K2, to avoid a case in which tracing is difficult because the distance between the light hole K1 and the light hole K2 in the array direction is not large. In addition, compared with a solution in which no extension region Q1 exists, in the solution shown in FIG. 9, a trace area of the metal trace 32 in the extension region Q1 can be harvested, so that radiation performance of the NFC antenna can be improved.

It should be understood that, in another embodiment, the extension region Q1 may alternatively not pass through a position between the light-passing hole K1 and the light-passing hole K2, the extension region Q1 may alternatively extend toward another position between the light hole K1 and the light hole K2, and the first trace L1 and the second trace L2 may alternatively converge in another direction between the light hole K1 and the light hole K2. This is not specifically limited in this embodiment of this application. For a specific implementation effect, refer to the solution shown in FIG. 8. Details are not described herein again.

It should be noted that a most critical factor that affects the radiation performance of the NFC antenna 30 is a trace area of the metal trace 32. Whether ferrite exists in a trace region of the metal trace 32 has relatively little impact on the radiation performance of the NFC antenna 30. Based on this, an embodiment of this application further provides an electronic device shown in FIG. 10 below.

Figure 10:
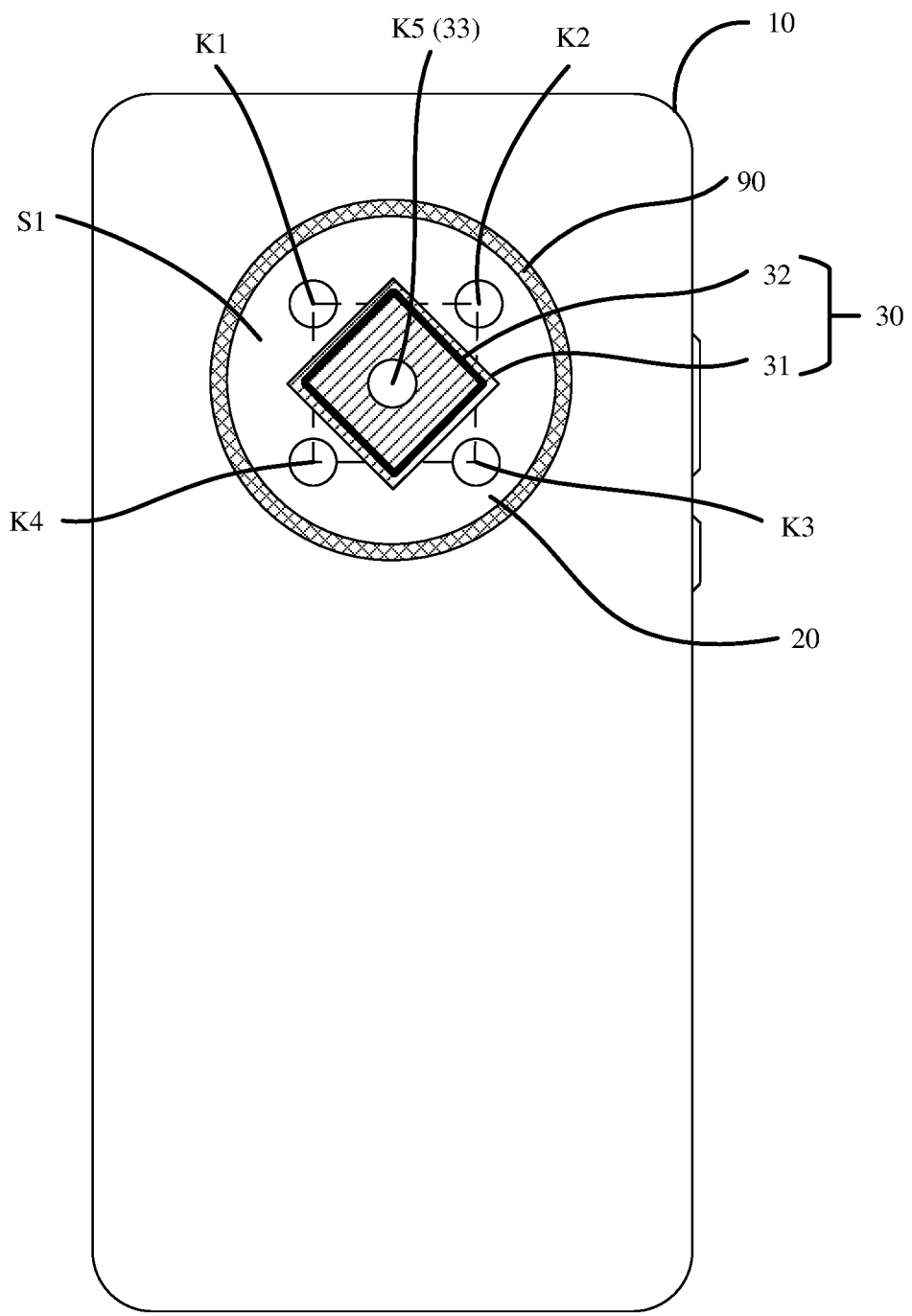
FIG. 10 is a schematic diagram of a structure of an electronic device according to some other embodiments of this application.

Referring to FIG. 10, FIG. 10 is a schematic diagram of a structure of an electronic device according to some other embodiments of this application. Different from the electronic device shown in FIG. 9, in the electronic device, an avoidance hole 33 (located at a same position as a light hole K5) is further disposed in an NFC antenna 30. A region of the avoidance hole K5 in a first orthographic projection is an avoidance region, and the avoidance region is located inside a ring corresponding to a trace projection region. The avoidance region overlaps the light hole K5 (a second light hole). In other words, the light hole K5 is disposed in a region that is of a camera bracket 20 and that faces the avoidance hole 33. The light hole K5 may be opposite to a camera. In this case, light can sequentially pass through the avoidance hole 33 and the light hole K5 and enter the camera, to implement shooting. Alternatively, the light hole K5 may be opposite to a camera flash. In this case, light emitted by the camera flash can sequentially pass through the light hole K5 and the avoidance hole 33 and be emitted to an outer side of the electronic device, to implement irradiation. Alternatively, the light hole K5 may be opposite to a sensor. In this case, the sensor may monitor an external environment by using the avoidance hole 33 and the light hole K5.

It should be understood that the avoidance region is located inside the ring corresponding to the trace projection region. It indicates that the avoidance hole 33 is disposed in a region inside the metal trace 32. The disposition of the avoidance hole 33 does not affect a trace area of the metal trace 32, and therefore causes no impact on radiation performance of the NFC antenna 30. On a premise of ensuring the radiation performance of the NFC antenna 30, compared with the solution shown in FIG. 9, in the solution shown in FIG. 10, one more light hole is added in this embodiment on a basis of not increasing a size of the camera bracket. Therefore, mounting of one more camera can be supported, thereby helping meet a trend that a quantity of cameras increases.

It should be further understood that in the solution shown in FIG. 8, an avoidance hole 33 may also be disposed in the NFC antenna 30, to increase a quantity of cameras.

It should be noted that the first light hole may be configured to mount a camera, a camera flash, or a sensor. It can be learned that different components may be mounted in different first light holes, and the first light holes may be inconsistent in size. Generally, when a camera flash, a sensor with a relatively small volume, or a camera with a relatively small volume is mounted in the first light hole, the first light hole is relatively small: or when a camera or a sensor with a relatively large volume is mounted in the first light hole, the first light hole is relatively large. Based on this, in actual application, there is a possible scenario in which space between some first light holes and an edge of the camera bracket 20 is relatively small and space between some first light holes and the edge of the camera bracket 20 is relatively large. The scenario is different from those in FIG. 5, FIG. 8, FIG. 9, and FIG. 10 in which either space between all the first light holes and the edge of the camera bracket 20 is relatively large, or space between all the first light holes and the edge of the camera bracket 20 is relatively small.

Figure 11:
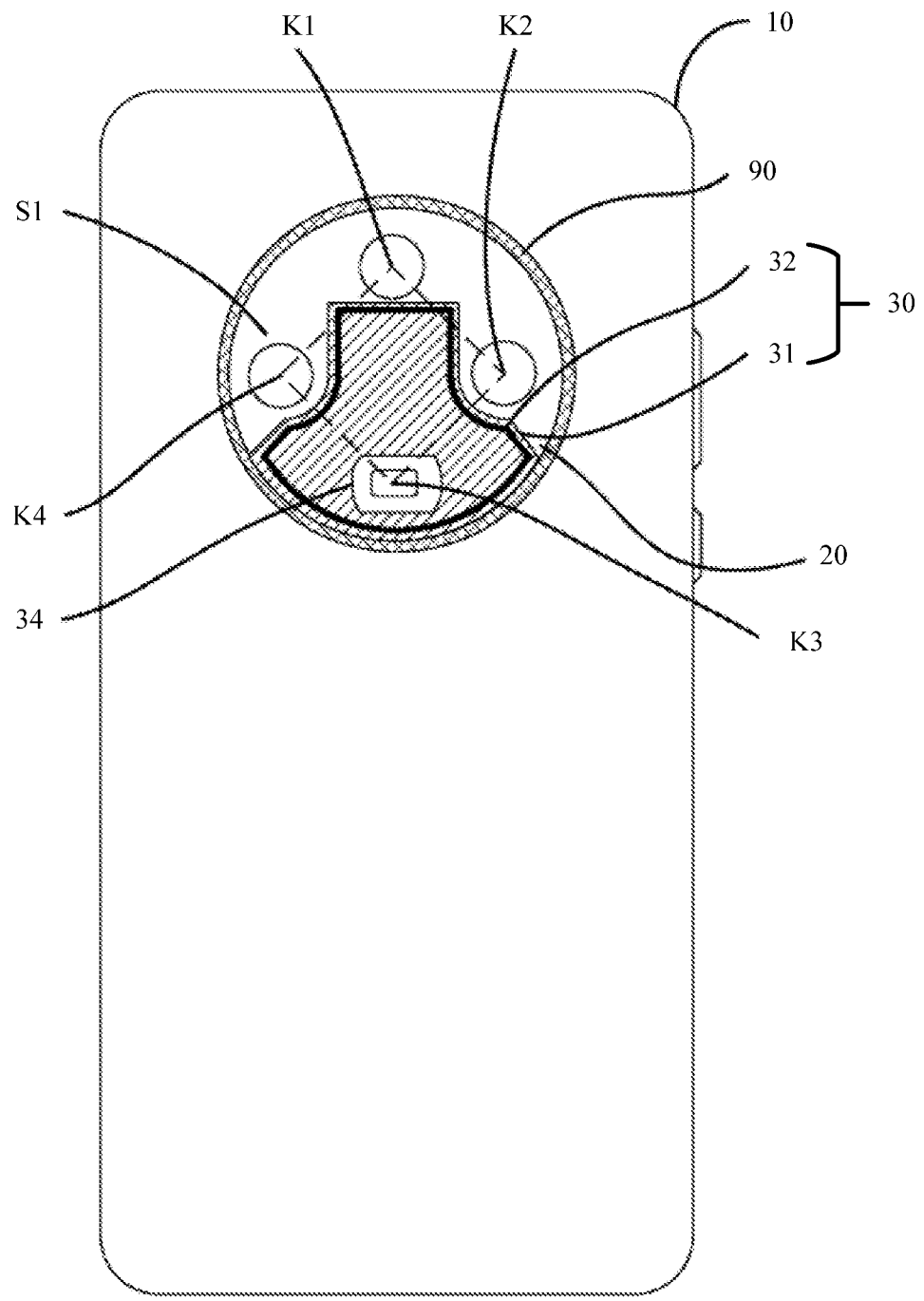
FIG. 11 is a schematic diagram of a structure of an electronic device according to some other embodiments of this application.

In some embodiments, when a smallest distance between an edge line of the first light hole and an edge line of the camera bracket 20 is less than a first threshold, it may be considered that space between the first light hole and the edge of the camera bracket 20 is relatively small: or when a smallest distance between an edge line of the first light hole and an edge line of the camera bracket 20 is greater than the first threshold, it may be considered that space between the first light hole and the edge of the camera bracket 20 is relatively large. For specific implementation of the first threshold, refer to the description of the first threshold in FIG. 7. Details are not described herein again. For example, referring to FIG. 11, FIG. 11 is a schematic diagram of a structure of an electronic device according to some other embodiments of this application. In the electronic device, smallest distances between edge lines of a light hole K1, a light hole K2, and a light hole K4 and an edge line of a camera bracket 20 are consistent with those shown in FIG. 9, and are all less than the first threshold. Different from the electronic device shown in FIG. 9, in this electronic device, a smallest distance between an edge line of a light hole K3 and the edge line of the camera bracket 20 is greater than the first threshold. Therefore, space between the light hole K3 and an edge of the camera bracket 20 is relatively large, and therefore can support laying of an NFC antenna to obtain a relatively large trace area.

Based on this, different from the solution shown in FIG. 9, in the electronic device shown in FIG. 11, the light hole K3 is located inside a ring corresponding to a trace projection region. In other words, a metal trace 32 surrounds the light hole K3. It can be learned that in this embodiment, a position (a position between the light hole K3 and the edge of the camera bracket 20) that is on the camera bracket 20 and at which tracing can be performed is fully utilized, so that a trace area can be maximized, thereby improving radiation performance of the NFC antenna 30.

It should be understood that, when the light hole K3 is surrounded by the metal trace 32, an avoidance hole 34 needs to be disposed in the NFC antenna 30, and the avoidance hole 34 faces the light hole K3. In addition, although FIG. 11 shows a case in which only a distance between the light hole K3 and the edge of the camera bracket 20 is relatively large among the four first light holes, in another embodiment, alternatively, distances between more first light holes and the edge of the camera bracket 20 may be relatively large, and an implementation process thereof is similar to that of the light hole K3. Details are not described herein.

It should be further understood that in the electronic device shown in FIG. 11, also referring to the solution shown in FIG. 10, an avoidance hole 33 may be disposed in the NFC antenna 30 to increase a quantity of cameras. This is not specifically limited in this embodiment of this application.

What is claimed is:

1. An electronic device, comprising:
a rear cover;
a camera bracket, wherein the camera bracket comprises a first surface and a second surface that are oppositely disposed, the first surface of the camera bracket faces an outer side of the electronic device, a first light hole is disposed in the camera bracket, and the first light hole is configured to be opposite to a first camera flash, a first sensor, or a first camera; and
an NFC antenna, laid on the first surface of the camera bracket, wherein
a first orthographic projection of the NFC antenna on the first surface of the camera bracket falls into the first surface of the camera bracket and does not overlap the first light hole, so that the NFC antenna avoids the first light hole,
wherein there are a plurality of first light holes; and the plurality of first light boles are arrayed in a ring on the camera bracket,
wherein ferrite and a metal trace traced along an edge of the ferrite are disposed on the NFC antenna; and a region of the metal trace on the first orthographic projection is a trace projection region, and the trace projection region is a ring;
a part of the plurality of first light holes are located outside the ring corresponding to the trace projection region; and
a remaining part of the plurality of first light holes are located inside the ring corresponding to the trace projection region, and
wherein when a smallest distance between an edge line of the first light hole and an edge line of the camera bracket is less than a first threshold, the first light hole is located outside the ring corresponding to the trace projection region, wherein the first threshold is at least a trace width of the metal trace.

2. The electronic device according to claim 1, wherein the first light hole is located inside the ring corresponding to the trace projection region.

3. The electronic device according to claim 2, wherein a smallest distance between an edge line of the first light hole and an edge line of the camera bracket is greater than a first threshold, and the first threshold is at least a trace width of the metal trace.

4. The electronic device according to claim 1, wherein a smallest distance between an edge line of the first light hole and an edge line of the camera bracket is less than a second threshold, and the second threshold is at least a trace width of the metal trace.

5. The electronic device according to claim 1, wherein when a smallest distance between an edge line of the first light hole and an edge line of the camera bracket is greater than the first threshold, the first light hole is located inside the ring corresponding to the trace projection region.

6. The electronic device according to claim 1, wherein an avoidance hole is disposed in the NFC antenna, a region of the avoidance hole on the first orthographic projection is an avoidance region, and the avoidance region is located inside the ring corresponding to the trace projection region.

7. The electronic device according to claim 6, wherein a second light hole is further disposed in the camera bracket, the second light hole overlaps the avoidance region, and the second light hole is configured to be opposite to a second camera flash, a second sensor, or a second camera.

8. The electronic device according to claim 1, further comprising a decorative lens, wherein
a back adhesive region is disposed at an edge of the first surface of the camera bracket, and the decorative lens is fastened to the first surface of the camera bracket through connection to the back adhesive region.

9. The electronic device according to claim 8, wherein the NFC antenna is disposed between the decorative lens and the first surface of the camera bracket, and the first orthographic projection does not overlap the back adhesive region.

10. An electronic device, comprising:
a rear cover;
a camera bracket, wherein the camera bracket comprises a first surface and a second surface that are oppositely disposed, the first surface of the camera bracket faces an outer side of the electronic device, a first light hole is disposed in the camera bracket, and the first light hole is configured to be opposite to a first camera flash, a first sensor, or a first camera; and
an NFC antenna, laid on the first surface of the camera bracket, wherein
a first orthographic projection of the NFC antenna on the first surface of the camera bracket falls into the first surface of the camera bracket and does not overlap the first light hole, so that the NFC antenna avoids the first light hole,
wherein there are a plurality of first light holes; and the plurality of first light holes are arrayed in a ring on the camera bracket,
wherein ferrite and a metal trace traced along an edge of the ferrite are disposed on the NFC antenna; and a region of the metal trace on the first orthographic projection is a trace projection region, and the trace projection region is a ring; and
the first light hole is located outside the ring corresponding to the trace projection region,
wherein two adjacent first light holes on an array path of the first light holes are respectively a first adjacent hole and a second adjacent hole; and
the NFC antenna has an extension region extending in a first direction, and the first direction deviates from a geometric center of the first surface of the camera bracket and is oriented between the first adjacent hole and the second adjacent hole,
wherein a distance between the first adjacent hole and the second adjacent hole in an array direction is greater than a third threshold, and the third threshold is at least three times a trace width of the metal trace,
wherein a part that is of the metal trace and that is located in the extension region comprises a first trace and a second trace, and both the first trace and the second trace extend in a second direction and pass through a position between the first adjacent hole and the second adjacent hole;
the first trace and the second trace are spaced apart in a third direction, the third direction is the array direction of the first adjacent hole and the second adjacent hole, and the second direction is perpendicular to the third direction.

11. An electronic device, comprising:
a rear cover;
a camera bracket, wherein the camera bracket comprises a first surface and a second surface that are oppositely disposed, the first surface of the camera bracket faces an outer side of the electronic device, a first light hole is disposed in the camera bracket, and the first light hole is configured to be opposite to a first camera flash, a first sensor, or a first camera; and
an NFC antenna, laid on the first surface of the camera bracket, wherein
a first orthographic projection of the NFC antenna on the first surface of the camera bracket falls into the first surface of the camera bracket and does not overlap the first light hole, so that the NFC antenna avoids the first light hole,
wherein there are a plurality of first light holes; and the plurality of first light holes are arrayed in a ring on the camera bracket,
wherein ferrite and a metal trace traced along an edge of the ferrite are disposed on the NFC antenna; and a region of the metal trace on the first orthographic projection is a trace projection region, and the trace projection region is a ring; and
the first light hole is located outside the ring corresponding to the trace projection region,
wherein two adjacent first light holes on an array path of the first light holes are respectively a first adjacent hole and a second adjacent hole; and
the NFC antenna has an extension region extending in a first direction, and the first direction deviates from a geometric center of the first surface of the camera bracket and is oriented between the first adjacent hole and the second adjacent hole,
wherein a distance between the first adjacent hole and the second adjacent hole in an array direction is less than a fourth threshold, and the fourth threshold is at least three times a trace width of the metal trace, and
wherein a part that is of the metal trace and that is located in the extension region comprises a first trace and a second trace, the first trace and the second trace gradually converge in a second direction, and the second direction is perpendicular to the array direction of the first adjacent hole and the second adjacent hole.

\* \* \* \* \*

UNITED STATES PATENT AND TRADEMARK OFFICE
CERTIFICATE OF CORRECTION

Page 1 of 1

PATENT NO. : 12,469,974 B2
APPLICATION NO. : 18/279257
DATED : November 11, 2025
INVENTOR(S) : Xiaoyong Dong It is certified that error appears in the above-identified patent and that said Letters Patent is hereby corrected as shown below:

On the Title Page

Change "(71) Applicant: HONOR DEVICE CO., LTD., Guangdong (CN)" to --(71) Applicant: HONOR DEVICE CO., LTD., Shenzhen (CN)--;

In the Specification

Column 8, Line 29, change "and the rear cover are" to --and the rear cover 10 are--; and In the Claims Column 20, Claim 1, Line 53, change "boles" to --holes--.

Signed and Sealed this
Ninth Day of December, 2025

John A. Squires
*Director of the United States Patent and Trademark Office*